United States Patent
Webb et al.

(10) Patent No.: US 9,053,568 B2
(45) Date of Patent: Jun. 9, 2015

(54) APPLYING A REALISTIC ARTISTIC TEXTURE TO IMAGES

(71) Applicant: Apple Inc., Cupertino, CA (US)

(72) Inventors: Russell Y Webb, Cupertino, CA (US); Alexis Gatt, Santa Clara, CA (US); Johnnie Manzari, San Francisco, CA (US); Randy Ubillos, Los Altos, CA (US)

(73) Assignee: Apple Inc., Cupertino, CA (US)

(*) Notice: Subject to any disclaimer, the term of this patent is extended or adjusted under 35 U.S.C. 154(b) by 264 days.

(21) Appl. No.: 13/834,064

(22) Filed: Mar. 15, 2013

(65) Prior Publication Data
US 2014/0071148 A1  Mar. 13, 2014

Related U.S. Application Data

(60) Provisional application No. 61/699,947, filed on Sep. 12, 2012.

(51) Int. Cl.
| | |
|---|---|
| *G09G 5/00* | (2006.01) |
| *G09G 5/02* | (2006.01) |
| *G09G 5/10* | (2006.01) |
| *G03F 3/08* | (2006.01) |
| *H04N 1/46* | (2006.01) |
| *G06K 9/00* | (2006.01) |
| *G06K 9/40* | (2006.01) |
| *G06K 9/36* | (2006.01) |

(Continued)

(52) U.S. Cl.
CPC ............ *G06T 11/001* (2013.01); *H04N 1/6058* (2013.01); *G09G 5/02* (2013.01)

(58) Field of Classification Search
USPC ......... 345/418–419, 589, 593–594, 606, 610, 345/618–619, 629–630, 501–502, 520, 345/690; 358/518, 525, 537–540, 448, 358/452–453; 382/162, 166–167, 254, 274, 382/276, 282, 284, 285, 303–303, 307, 382/260; 715/700, 764–765, 860
See application file for complete search history.

(56) References Cited

U.S. PATENT DOCUMENTS

| | | | |
|---|---|---|---|
| 6,996,287 B1* | 2/2006 | Weiss | 382/260 |
| 8,249,365 B1* | 8/2012 | Winnemoeller et al. | 382/219 |

(Continued)

OTHER PUBLICATIONS

"Deke\s Techniques 016: Turning a Photo into an Ink Drawing," video and description originally posted at http://www.deke.com/content/deke\s-techniques-016-turning-a-photo-ink-drawing, retrieved via web.archive.org on May 28, 2013.

(Continued)

*Primary Examiner* — Wesner Sajous
(74) *Attorney, Agent, or Firm* — Wong, Cabello, Lutsch, Rutherford & Brucculeri, LLP

(57) ABSTRACT

Techniques are disclosed to provide user control over the manipulation of a digital image. The disclosed techniques enable a user to apply various textures that mimic traditional artistic media to a selected image. User selection of a texture level results in the blending of texturized versions of the selected image in accordance with the selected texture level. User selection of a color level results in the adjustment of color properties of the selected image that are included in the output image. Control of the image selection, texture type selection, texture level selection, and color level selection may be provided through an intuitive graphical user interface.

24 Claims, 6 Drawing Sheets

(51) Int. Cl.
  *G06F 3/01* (2006.01)
  *G06F 3/048* (2013.01)
  *G06T 11/00* (2006.01)
  *H04N 1/60* (2006.01)

(56) References Cited

U.S. PATENT DOCUMENTS

2004/0012602 A1* 1/2004 Mech .......................... 345/581
2004/0212625 A1* 10/2004 Sekine et al. ............... 345/582
2012/0133779 A1* 5/2012 Ma et al. ..................... 348/175
2012/0212753 A1* 8/2012 Qiao et al. ................... 358/1.9

OTHER PUBLICATIONS

"Photoshop—Convert Photo to Pencil Sketch," video available at http://www.youtube.com/watch?v=fAugO9Gii0, retrieved on Jun. 14, 2013.

"Turn any Photo Into a Pencil Sketch," Dave Johnson, PCWorld, retrieved from http://www.pcworld.com/article/239837/turn_any_photo_into_a_pencil_sketch.html on May 28, 2013.

"Turn Your Photos into Charcoal Drawings," originally post at http://www.befunky.com/explore/2010/06/turning-your-photos-into-charcoal-drawings/, retrieved via web.archive.org on May 28, 2013.

* cited by examiner

APPLYING A REALISTIC ARTISTIC TEXTURE TO IMAGES

BACKGROUND

This disclosure relates generally to the creation of artistic images having various textures that mimic traditional artistic media. More particularly, the disclosure relates to facilitating user control over the generation of such images.

The increased availability of devices capable of obtaining high quality digital photographs and the corresponding increase in the popularity of digital photography have led to an increased interest in digital image editing among amateur and professional photographers alike. Existing digital photographic editing techniques enable users to apply artistic touches to images. However, these techniques are often limited to the application of predefined elements to a user's photographs. Such existing techniques limit a user's control over the editing experience. It would therefore be desirable to enable a user to experiment with different artistic elements in a manner that allows the user to retain control over the image editing experience.

SUMMARY

In one embodiment, a method to generate an artistic image having a texture that mimics a traditional artistic medium is disclosed. An input image to which a selected texture is to be applied may first be obtained such as, for example, by a user selection of the image. First and second texturized images may be generated from the input image and a selected texture type. A combined texturized image may thereafter be generated from the first and second texturized images and a selected texture level. A colorized image may be generated based, at least in part, on the combined texturized image and a selected color level, and an output image may be generated from the combined texturized image and the colorized image. The method may be embodied in program code and stored on a non-transitory storage medium. The stored program code may be executed by one or more processors.

In another embodiment, a method to facilitate creation of an artistic image having a texture that mimics a traditional artistic medium is disclosed. A graphical user interface that facilitates the creation of an artistic image may be displayed. The graphical user interface may include one or more selectable image objects representative of one or more images, one or more selectable texture objects representative of one or more texture types, a texture level selector and a color level selector. A selection of one of the selectable image objects and one of the selectable texture objects representative of a selected image and a selected texture type, respectively, may be received. A first texturized image and a second texturized image may be generated using the selected image and the selected texture type. A combined texturized image may then be generated from the first texturized image and the second texturized image in accordance with a texture level received via the texture level selector. A colorized output image may be generated from the combined texturized image, the selected image, and a color level received via the color level selector. The method may be embodied in program code and stored on a non-transitory storage medium. The stored program code may be executed by one or more processors.

DETAILED DESCRIPTION

This disclosure pertains to systems, methods, and computer readable media for applying an artistic texture to an image. In general, techniques are disclosed for generating a texturized image by applying a selected texture to an image in accordance with the user's selection of a texture level. The disclosed techniques further enable a user to control the amount of color from the original image to be applied to the resulting texturized image via a selection of a color level.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of image processing having the benefit of this disclosure.

Figure 1:
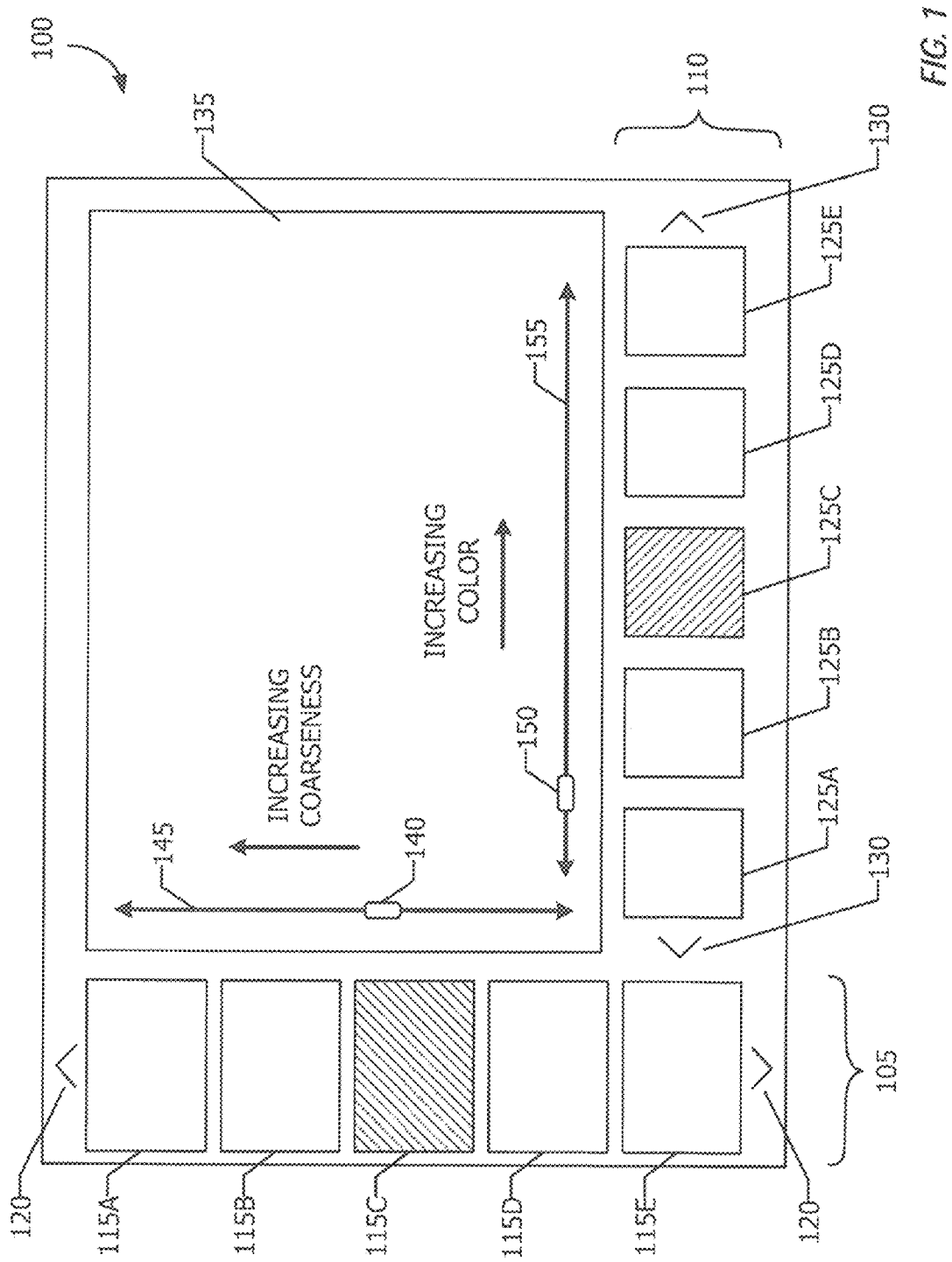
FIG. 1 illustrates an example user interface that may be utilized to apply an artistic texture to images in accordance with one embodiment.

Referring to FIG. 1, example user interface 100 demonstrates a user's control over the application of an artistic texture to a selected image and the feedback provided to the user. It will be understood that user interface 100 represents a single example interface that could be implemented to enable a user to realize the disclosed functionality and is not intended to be limiting in any manner. Numerous additional interface designs may also enable a user to realize the disclosed image manipulation functionality. In the illustrated embodiment, user interface 100 includes an image selector portion 105 along a left edge of user interface 100 and a texture selector portion 110 along a bottom edge of user interface 100. Multiple thumbnails 115 are displayed within image selector portion 105. In one embodiment, the images available for editing (represented by thumbnails 115) may be imported into an application that provides user interface 100. In another embodiment, all of the images stored in a particular directory location may be available for editing (and therefore displayed as thumbnails 115 in image selector portion 105).

In the illustrated embodiment, the user may scroll through multiple images by selecting arrows 120. In another embodiment, user interface 100 may be displayed on a touch screen device and the user may scroll through thumbnails 115 in image selector portion 105 using a touch gesture (e.g., a swipe gesture). When the thumbnail of a desired image is displayed in image selector portion 105, the image may be selected for editing by selecting the thumbnail (e.g., via a selector device or by touching the thumbnail). In the illustrated embodiment, the image associated with thumbnail 115C is selected for editing.

Multiple texture swatches 125 are displayed within texture selector portion 110. Swatches 125 may correspond to textures that represent traditional artistic media such as pencil, charcoal, ink, water color, crayon, pastel, etc. Selection of a particular image-texture combination may result in the generation of an image that mimics the creation of the selected image using the artistic medium represented by the selected texture (e.g., a charcoal drawing of the selected image). In one embodiment, texture swatches 125 may display an image representative of the texture if no image has been selected and may display a preview of the selected image with the texture applied if an image has been selected. In the same manner that a user can navigate through images in image selector portion 105, the user may also be able to navigate through various texture swatches in texture selector portion 110 using either arrows 130 or touch gestures. When a swatch corresponding to a desired texture is displayed within texture selector portion 110, the desired texture may be selected by choosing the swatch (e.g., via a selector device or by touching the thumbnail). In the illustrated embodiment, the texture corresponding to swatch 125C is selected.

The selected image may be displayed within image preview window 135. In one embodiment, if no texture has been selected, the selected image may be displayed in its original form in preview window 135 (i.e., with no texture effect). If an image and a texture have been selected, the image may be displayed with the selected texture effect applied in preview window 135. In such an embodiment, the initial image displayed in preview window 135 may include a texture effect having a default coarseness and default color.

Within preview window 135, a user may set a texture level to be applied to the generated image by adjusting the position of slider 140 along slider bar 145 (or a functionally equivalent control) and may set a color level to be applied to the generated image by adjusting the position of slider 150 along slider bar 155 (or a functionally equivalent control). In one embodiment, the sliders and slider bars may only be displayed when the user is actively editing a selected image. For example, the sliders may only be displayed when a selector device (e.g., a mouse pointer) hovers over preview window 135 or when the user touches the preview window on a touch display device. Although the illustrated embodiment depicts separate color and texture sliders (145 and 155), in an alternate embodiment, preview window 135 may represent a two-dimensional texture-color continuum such that a selection of any point within preview window 135 represents a unique texture-color combination. In such an embodiment, an indicator within preview window 135 may represent the current texture-color location and the user may be able to move the indicator to any location within preview window 135 to alter the texture and color levels. While such an embodiment may allow a user to simultaneously adjust a color level and a texture level to be applied to the generated image, in an alternate embodiment, the user experience may be improved if only one of color level or texture level is adjusted at any particular time. For example, in response to the detection of an indicator adjustment in a vertical direction (e.g., contact with the preview window portion of a touch sensitive interface along the texture adjustment direction), arrows may be displayed to indicate that the texture level can be adjusted by moving the indicator either up or down but not left or right (i.e., no color level adjustment). Likewise, detection of an indicator adjustment in a horizontal direction may result in the display of arrows to indicate that the color level can be adjusted by moving the indicator either left or right but not up or down (i.e., no texture level adjustment). The application of a selected texture to a selected image and the utilization of the user-selected texture and color levels will be described in greater detail below.

Figure 2:
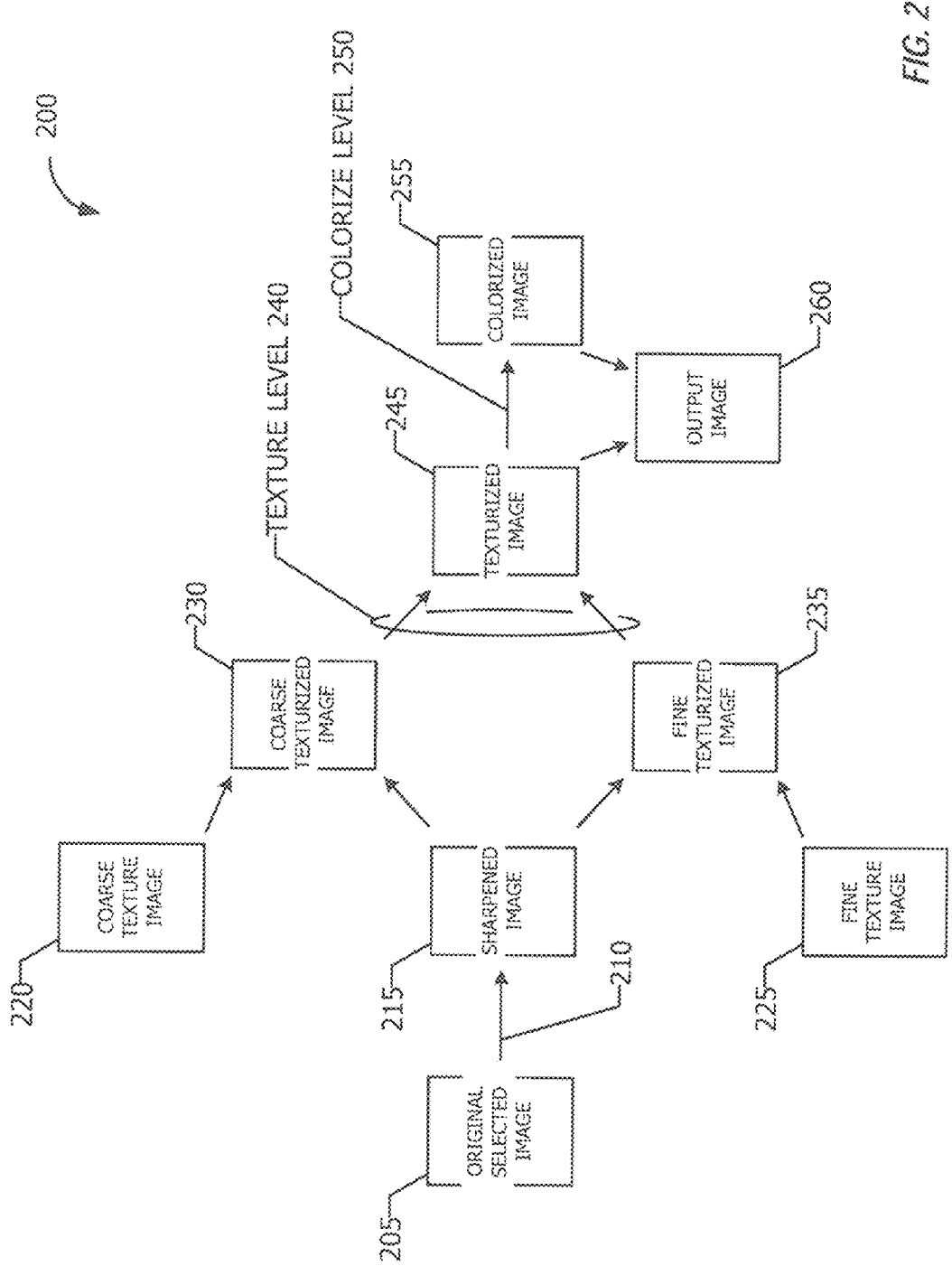
FIG. 2 is a block diagram that illustrates the application of an artistic texture to an image in accordance with one embodiment.
Figure 3:
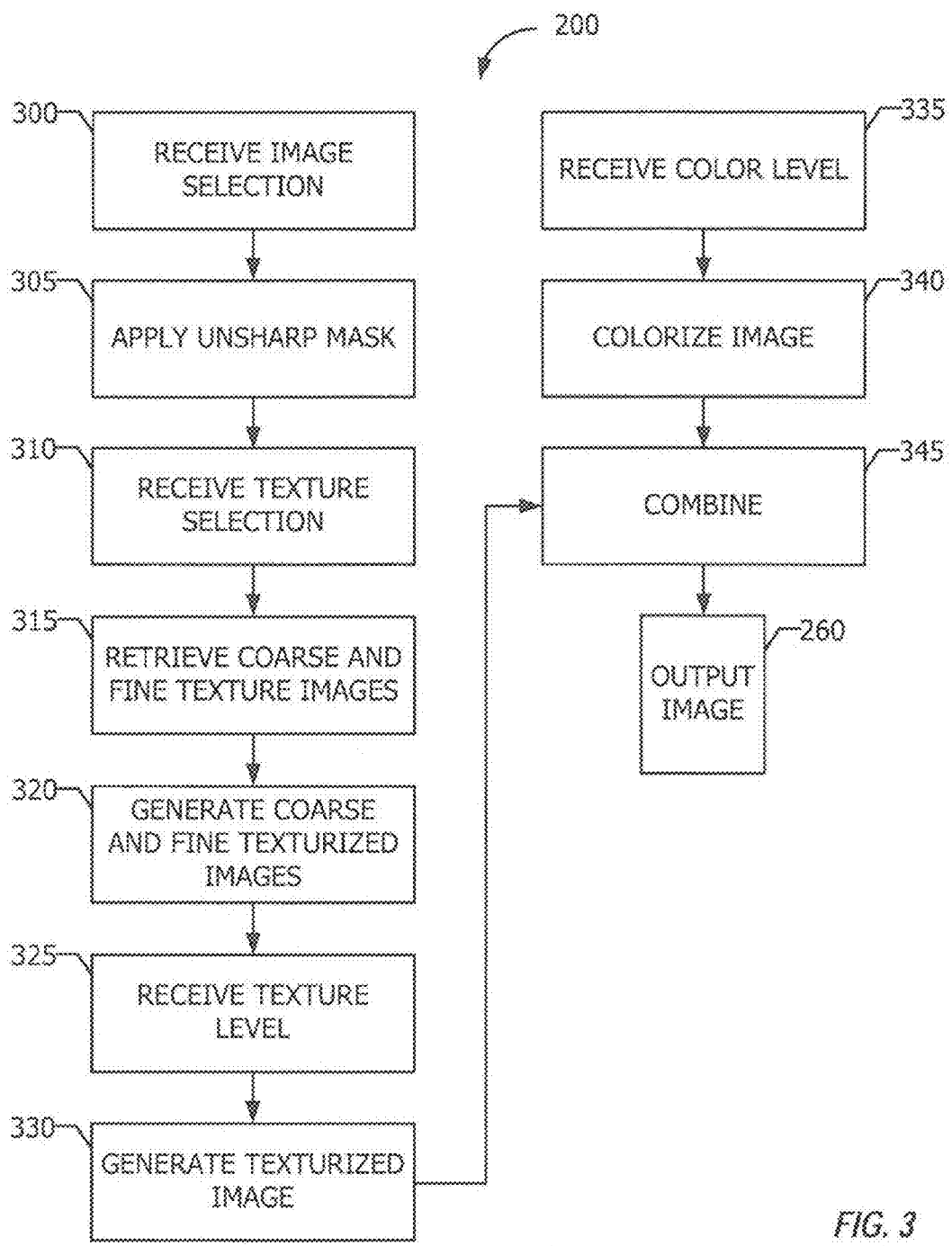
FIG. 3 is a flow chart that illustrates the operation of FIG. 2.

Referring to FIGS. 2 and 3, image operation 200 may begin with receipt of selected image 205 (block 300). In one embodiment, image 205 may be selected in the manner illustrated in FIG. 1. That is, a user may select image 205 for editing from within an application that provides an interface such as interface 100. After image 205 has been selected, unsharp mask 210 may be applied to generate sharpened image 215 (block 305). As is known by those of ordinary skill in the art, an unsharp mask may be used to sharpen an image and enhance image details, specifically edge details. In one embodiment, the properties of unsharp mask 210 (i.e., radius and strength) may be predefined. In such an embodiment, the predefined properties may be dependent on image size. For example, the radius value utilized to generate unsharp mask 210 may account for the differences between a 12 megapixel image and a 36 megapixel image such that the same resulting effect is obtained. In another embodiment, the user may be able to specify the properties of unsharp mask 210. For example, user interface 100 may include functionality that allows the user to specify radius and strength values for unsharp mask 210. In one embodiment, the image may be displayed within a preview window (such as preview window 135). The displayed image may be either original image 205 or sharpened image 215.

After application of unsharp mask 210, a selected texture may be received (block 310). As described briefly above, the texture may be selected from multiple textures that represent different artistic media such as, for example, swatch 125C from texture selector portion 110. Application of a selected texture to a selected image may create the appearance that the selected image was created using the artistic medium associated with the selected texture. For example, application of a charcoal texture to a selected image may generate an image resembling a charcoal drawing of the original image.

Figure 4A:
FIGS. 4A and 4B illustrate a coarse texture image and a fine texture image, respectively, for a particular texture type in accordance with one embodiment.
Figure 4B:

Coarse 220 and fine 225 texture images corresponding to the texture selected in accordance with block 310 may be retrieved (block 315). In one embodiment, coarse texture image 220 is a lighter version and fine texture image 225 is a darker version of the same texture image. In one embodiment, coarse and fine texture images for each of the available texture types may be predefined. In another embodiment, a single image for each texture type may be predefined and the coarse and fine texture images created based on a manipulation of the predefined image. In such an embodiment, coarse 220 and fine 225 texture images may be created by applying offsets, exponents, and/or thresholding operations to the predefined image for the selected texture type. Therefore, retrieving coarse 220 and fine 225 texture images in accordance with block 315 may involve retrieving predefined images for the selected texture or retrieving a single image for the selected texture and generating the coarse and fine images therefrom. Examples of a coarse texture image and a fine texture image for a charcoal drawing texture are depicted in FIGS. 4A and 4B respectively.

In one embodiment, coarse texture image 220 and fine texture image 225 for a texture selected in accordance with block 310 are grayscale images. It will be understood that a grayscale image may be represented as a color image having equal values for various color components (i.e., r=g=b). In another embodiment, coarse texture image 220 and fine texture image 225 are colored images. In such an embodiment, the colored texture images may highlight colors in the original image to which the texture is applied or may simulate a colored artistic medium. For example, a green texture may highlight foliage and a blue texture may highlight water in an image to which they are applied. As part of operations in accordance with block 315, texture images 220 and 225 may be scaled to the same aspect ratio as selected image 205 (e.g., image 115C) such that they may be combined with selected image 205 as described below.

Sharpened image 215 may be combined with each of the retrieved coarse and fine texture images 220 and 225 to generate coarse texturized image 230 and fine texturized image 235 (block 320). Coarse and fine texturized images 230 and 235 represent the application of a minimum texture effect and a maximum texture effect to sharpened image 215. In one embodiment, generation of coarse texturized image 230 and fine texturized image 235 may be achieved using the following sample instructions or program code as applied to the Apple® Core Image framework:

```
kernel vec4 coreImageKernel(sampler image, sampler pencilIm, float amt){
    vec4 im = sample(image, samplerCoord(image));
    float grey = min(dot(vec3(1.0/3.0), im.rgb), 1.0);
    vec4 pencil = sample (pencilIm, samplerCoord(pencilIM));
    float p =min(dot(vec3(1.0/3.0), pencil.rgb), 1.0);
    vec4 blend1 = vec4(pencil.rgb + 1.5*sign(grey)*pow(abs(grey), amt), 1.0);
    vec4 blend2 = vec4(mix(vec3(grey), pencil.rgb, pow(p, 2.0*amt)), 1.0);
    vec4 greyResult = mix(blend1, blend2, 0.5);
    return vec4(greyResult.rgb, 1.0);
}
``` where "image" represents sharpened image 215, "pencilIm" represents either coarse 220 or fine 225 texture image for a selected texture, and "amt" represents a variable (having a typical value in the 0.5 to 1.5 range) used to darken the resulting image (Apple is a registered trademark of Apple Inc.).

Algebraic simplification of the operations leading to the blend1, blend2, and greyResult values yields the following simplified equations that are equivalent for grayscale results:

```
float S = amt;
float G = max (0.0, grey);
float T = p;
float result = 0.5*(T – pow(T, 2.0*S)*G + pow(T, 1.0 + 2.0*S) +
    G + (1.5 + 0.0*S)*pow(G, S));
```

For typical values of "amt", the above expression for "result" can be further simplified as follows:

```
float result = 0.5*(T – T*G + pow(T, 4.0) + G + 1.5*pow(G, S));
```
or
```
float result = 0.5*(abs(T – pow(T, 4.0*S)*G) + pow(T, 4.0) + G +
    1.5*pow(G, S));
```

Returning to FIGS. 2 and 3, texture level 240 may be received as a user input to specify the strength of the texturizing effect applied to coarse 230 and fine 235 texturized images (block 325). Texture level 240 may be received as an input through, for example, texture level slider 140/145 in user interface 100 illustrated in FIG. 1. In one embodiment, texturized image 245 may be a weighted combination (i.e., weighted by the texture level) of coarse texturized image 230 and fine texturized image 235 (block 330). In one embodiment, coarse and fine texturized images may be combined in accordance with the following sample instructions or program code:

image=TL*coarse+(1.0–TL)*fine, where "TL" represents normalized texture level 240 as provided through user interface 100 via, for example, slider control 140/145 (i.e., where 1.0 is the maximum coarseness and 0.0 is the minimum coarseness), "image" represents a pixel value of texturized image 245, "coarse" represents a corresponding pixel value from coarse texturized image 230, and "fine" represents a corresponding pixel value from fine texturized image 235. Although texturized image 245 has been described as being generated based on a simple weighted combination of the coarse and fine texturized images, texture level 240 may be utilized to combine coarse and fine texturized images in other manners as well. For example, rather than a simple linear weighted combination, the texture level may be utilized to determine the respective weighting to be assigned to the coarse and fine texturized images according to a predefined non-linear function. Although texturized image 245 has been described as being generated from the combination of two texturized images (i.e., coarse texturized image 230 and fine texturized image 235), texturized image 245 could also be generated from the combination of a larger number of texturized images. For example, an input image could be combined with three or more texture images to generate three or more texturized images that are each weighted according to a selected texture level and are combined into a combined texturized image. In one embodiment, texturized image 245 will be a grayscale image having the desired level of the selected texture applied to the selected image.

Figure 5:
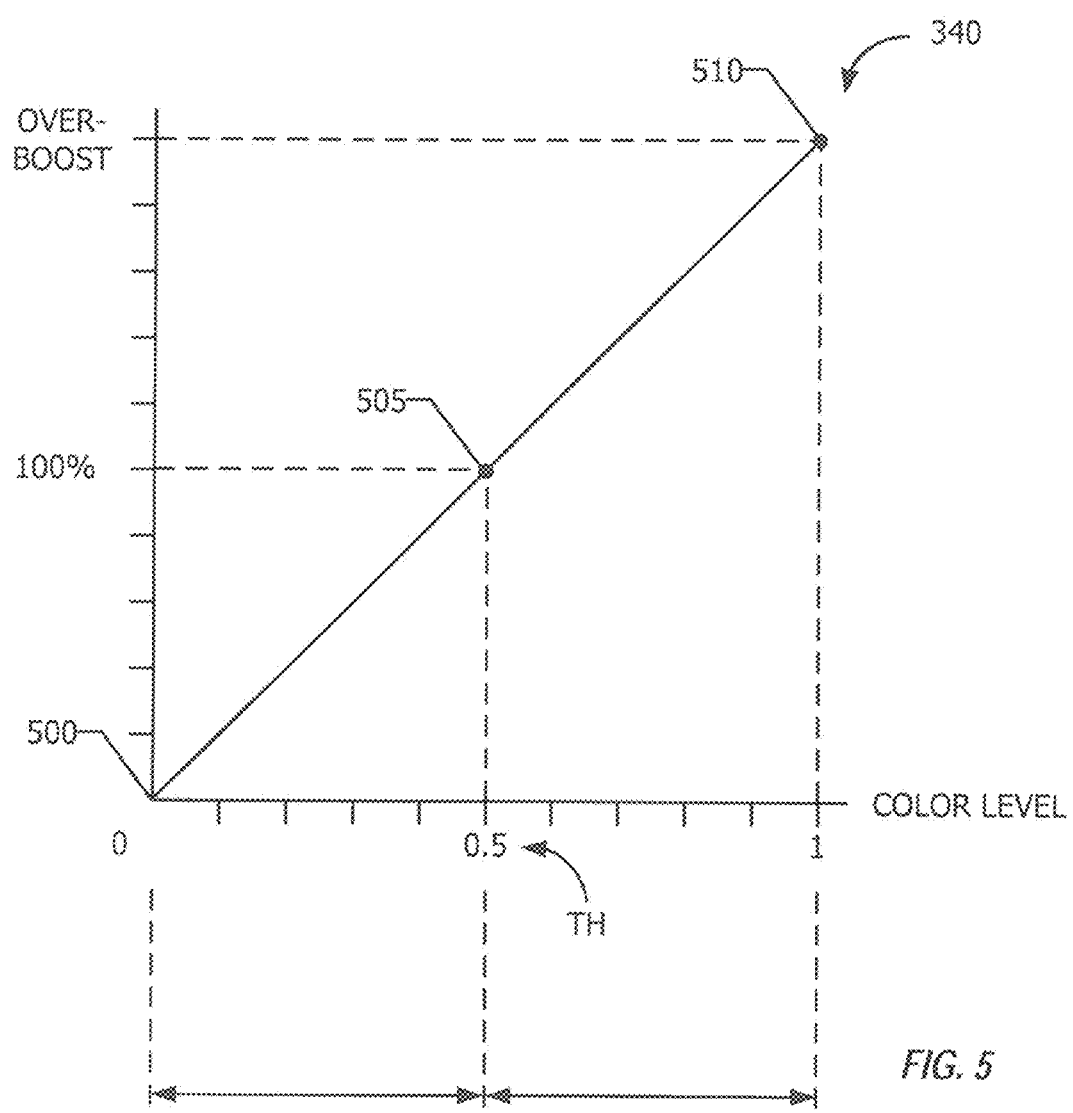
FIG. 5 is a graph that illustrates a portion of a colorization operation in accordance with one embodiment.

Continuing, colorize level 250 may be received (block 335) as a user input to specify the strength or level of colorization to apply to texturized image 245 (block 340). Colorize level 250 may be received, for example, through slider 150/155 in user interface 100 illustrated in FIG. 1. A colorization operation in accordance with one embodiment of block 340 may work as depicted in FIG. 5. In the illustrated embodiment, the specified color level (e.g., 250) is depicted along the horizontal axis, the resulting colorized image color is illustrated along the vertical axis, and a normalized threshold color level of 0.5 has been defined. Point 500 corresponds to a color level of 0 and represents a grayscale version of texturized image 245. That is, no color from original image 205 is added to texturized image 245 when colorize level 250 is equal to 0. As colorize level 250 is increased between point 500 and point 505, color is gradually added to texturized image 245 (e.g., via blending into non-white pixels of texturized image 245) until, at point 505 (corresponding to the threshold color level value, "TH"), 100% of the color from original image 205 is included in colorized image 255. As colorize level 250 is further increased from point 505 to point 510, the color level in colorized image 255 varies from the color in original image 205 (at point 505) to the color in a vibrance-filtered version of original image 205, fully effected at point 510. In the illustrated embodiment, color values in colorized image 255 can be determined in accordance with the following blend operations, expressed as instructions or program code applicable to an environment making use of Apple's Core Image framework:

---
mix(orig, gray, (TH − colorAmt)/TH)); for $0 \le \text{colorAmt} \le \text{TH}$
and
mix(orig, vibrance, (colorAmt − TH)/(1 − TH)); for $\text{TH} < \text{colorAmt} \le 1$

--- where "orig" represents original image 205, "gray" represents a grayscale version of original image 205, "vibrance" represents a vibrance-filtered version of original image 205, "colorAmt" represents the color level, "TH" represents the threshold color level (e.g., 0.5 in FIG. 5), and mix( ) represents a generic mixing, combining or blending function. In accordance with the above program code, the color quality of colorized image 255 may be controlled based on a user's selection of the color level (e.g., colorize level 250) between a grayscale version of original image 205 and a full vibrance-filtered version of original image 205. In general, vibrance filters adjust an image's saturation so that clipping is minimized as colors approach full saturation, changing the saturation of all lower-saturated colors with less effect on the higher saturated colors. Therefore, a vibrance filter increases the vibrance of an image by applying a controlled color enhancement that balances saturation levels throughout an image. It has been found that the use of vibrance filters as described herein substantially prevents skin tones from becoming oversaturated.

Once colorized image 255 is generated, textured image 245 and colorized image 255 may be combined to generate output image 260 (block 345). Combine operations in accordance with block 345 may utilize substantially any functional combination that meets the designer's goals. One well-known combination function is a weighted blend operation.

Figure 6:
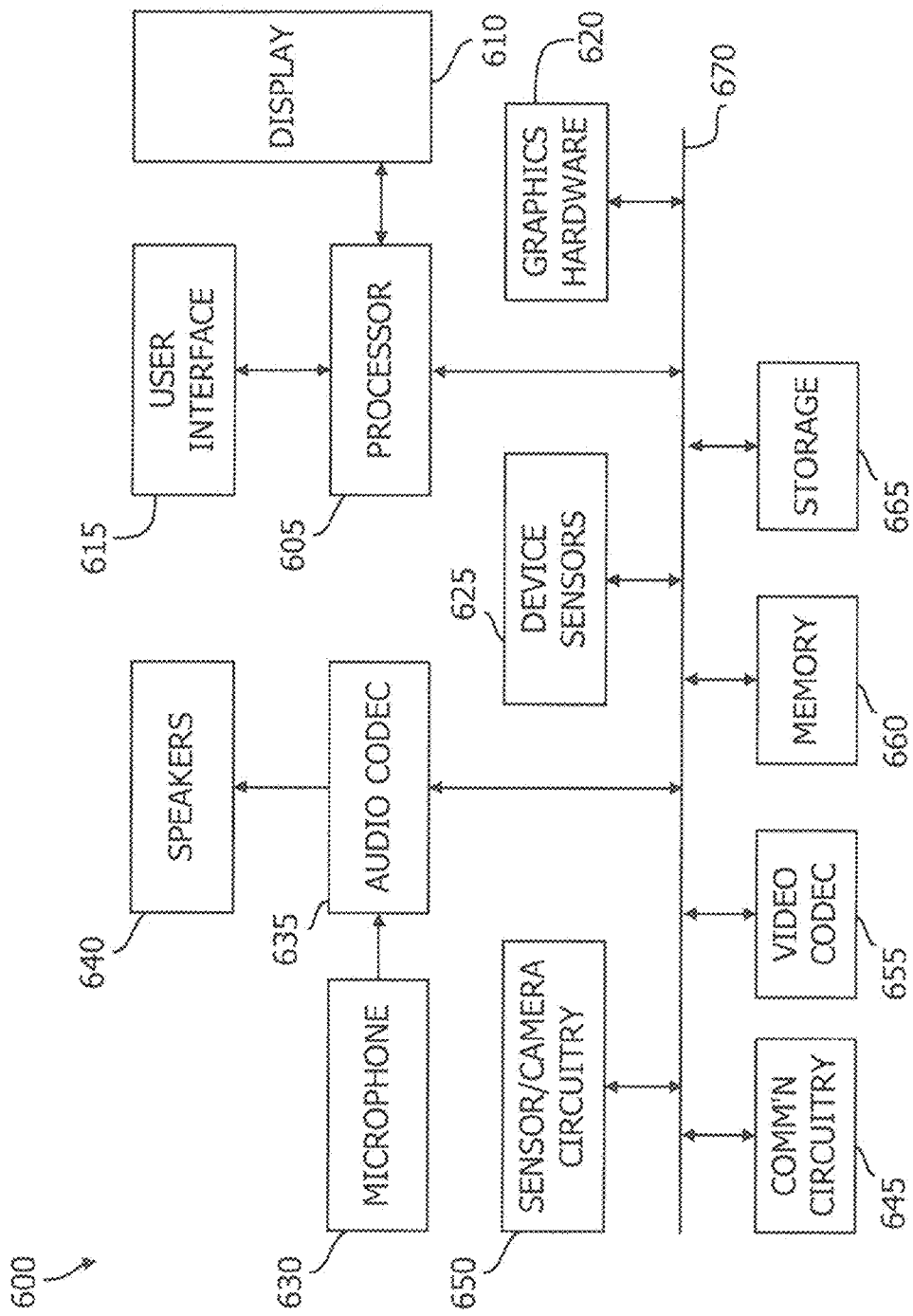
FIG. 6 is a block diagram of an illustrative electronic device in accordance with one embodiment.

Referring to FIG. 6, a simplified functional block diagram of illustrative electronic device 600 is shown according to one embodiment. Electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture unit 650, video codec(s) 655, memory 660, storage 665, and communications bus 670. Electronic device 600 may be, for example, a portable device such as a personal digital assistant (PDA), personal music player, mobile telephone, notebook, laptop or tablet computer. Electronic device 600 may also be a non-portable device such as, for example, a desktop or server computer. More particularly, the disclosed operations may be implemented on a device having some or all of the components of device 600.

Processor 605 may execute instructions necessary to carry out or control the operation of many functions performed by device 600. Processor 605 may, for instance, drive display 610 and receive user input from user interface 615. User interface 615 can take a variety of forms, such as a button, keypad, dial, a click wheel, mouse, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable graphics processing unit (GPU).

Sensor and camera circuitry 650 may capture still and video images that may be processed, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods (such as operation 200) described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause one or more processors to:
   obtain an input image;
   generate first and second texturized images based, at least in part, on the input image and a selected texture type;
   generate a combined texturized image based, at least in part, on the first and second texturized images and a selected texture level;
   generate a colorized image based, at least in part, on the combined texturized image and a selected color level; and
   generate an output image based, at least in part, on the combined texturized image and the colorized image.

2. The non-transitory program storage device of claim 1, wherein the instructions to cause the one or more processors to obtain an input image comprise instructions to case the one or more processors to:
  receive a selection of a first image; and
  apply an unsharp mask to the first image to generate the input image.

3. The non-transitory program storage device of claim 1, wherein the instructions to cause the one or more processors to generate first and second texturized images comprise instructions to cause the one or more processors to:
  obtain a first texture image and a second texture image corresponding to a selected texture type;
  combine the input image with the first texture image to generate the first texturized image; and
  combine the input image with the second texture image to generate the second texturized image.

4. The non-transitory program storage device of claim 3, wherein the first texture image comprises a coarse version of the selected texture type and the second texture image comprises a fine version of the selected texture type.

5. The non-transitory program storage device of claim 1, wherein the instructions to cause the one or more processors to generate first and second texturized images based, at least in part, on the input image and a selected texture type comprise instructions to cause the one or more processors to obtain the selected texture type through a graphical user interface.

6. The non-transitory program storage device of claim 1, wherein the instructions to cause the one or more processors to generate a combined texturized image comprise instructions to cause the one or more processors to blend the first texturized image with the second texturized image based, at least in part, on the selected texture level.

7. The non-transitory program storage device of claim 1, wherein the instructions to cause the one or more processors to generate a combined texturized image comprise instructions to cause the one or more processors to obtain the selected texture level through a graphical user interface.

8. The non-transitory program storage device of claim 7, wherein the instructions to cause the one or more processors to generate a colorized image comprise instructions to cause the one or more processors to obtain the selected color level through the graphical user interface.

9. The non-transitory program storage device of claim 1, wherein the instructions to cause the one or more processors to generate a colorized image comprise instructions to cause the one or more processors to:
  apply a first colorize regime for a first range of selected color level; and
  apply a second colorize regime for a second range of selected color level.

10. The non-transitory program storage device of claim 9, wherein the instructions to cause the one or more processors to apply a first colorize regime for a first range of selected color level comprise instructions to cause the one or more processors to blend between a gray version of the input image and the input image.

11. The non-transitory program storage device of claim 10, wherein the instructions to cause the one or more processors to blend between a gray version of the input image and the input image comprise instructions to cause the one or more processors to linearly interpolate a color between the gray version of the input image and the input image based, at least in part, on the value of the selected color level.

12. The non-transitory program storage device of claim 9, wherein the instructions to cause the one or more processors to apply a second colorize regime for a second range of selected color level comprise instructions to cause the one or more processors to blend between the input image and a vibrance-filtered version of the input image.

13. The non-transitory program storage device of claim 12, wherein the instructions to cause the one or more processors to blend between the input image and a vibrance-filtered version of the input image comprise instructions to cause the one or more processors to linearly interpolate a color between the input image and a vibrance-filtered version of the input image based, at least in part, on the value of the selected color level.

14. The non-transitory program storage device of claim 8, wherein the instructions to cause the one or more processors to obtain the selected texture level through a graphical user interface comprise instructions to cause the one or more processors to:
  determine that a touch-sensitive user interface component has been contacted along a first direction; and
  display arrows on the touch-sensitive user interface component coincident with the first direction in response to having determined that the touch-sensitive user interface component has been contacted along a first direction, wherein the arrows indicate along which directions the touch-sensitive user interface component may be manipulated to effect a change in the selected texture level.

15. The non-transitory program storage device of claim 14, wherein the instructions to cause the one or more processors to obtain the selected color level through a graphical user interface comprise instructions to cause the one or more processors to:
  determine that the touch-sensitive user interface component has been contacted along a second direction; and
  display arrows on the touch-sensitive user interface component coincident with the second direction in response to having determined that the touch-sensitive user interface component has been contacted along a second direction, wherein the arrows indicate along which directions the touch-sensitive user interface component may be manipulated to effect a change in the selected color level.

16. A method, comprising:
  obtaining, by one or more processors, an input image;
  generating, by the one or more processors, first and second texturized images based, at least in part, on the input image and a selected texture type;
  generating, by the one or more processors, a combined texturized image based, at least in part, on the first and second texturized images and a selected texture level;
  generating, by the one or more processors, a colorized image based, at least in part, on the combined texturized image and a selected color level; and
  generating, by the one or more processors, an output image based, at least in part, on the combined texturized image and the colorized image.

17. The method of claim 16, wherein the act of generating first and second texturized images comprises:
  obtaining a first texture image and a second texture image corresponding to a selected texture type;
  combining the input image with the first texture image to generate the first texturized image; and
  combining the input image with the second texture image to generate the second texturized image.

18. The method of claim 16, wherein the act of generating a combined texturized image comprises generating a weighted combination of the first texturized image with the second texturized image based, at least in part, on the selected texture level.

19. A non-transitory program storage device, readable by a processor and comprising instructions stored thereon to cause one or more processors to:
   display a graphical user interface comprising:
      one or more selectable image objects representative of one or more images;
      one or more selectable texture objects representative of one or more texture types;
      a texture level selector; and
      a color level selector;
   receive a selection of one of the selectable image objects, the selected image object corresponding to a selected image;
   receive a selection of one of the selectable texture objects, the selected texture object corresponding to a selected texture type;
   generate a first texturized image and a second texturized image based, at least in part, on the selected image and the selected texture type;
   generate a combined texturized image based, at least in part, on the first texturized image, the second texturized image, and a texture level received via the texture level selector; and
   generate a colorized output image based, at least in part, on the combined texturized image, the selected image, and a color level received via the color level selector.

20. The non-transitory program storage device of claim 19, wherein the instructions to cause the one or more processors to display a graphical user interface further comprise instructions to cause the one or more processors to display a graphical user interface comprising an image preview frame.

21. The non-transitory program storage device of claim 20, wherein the image preview frame represents a two-dimensional texture-color continuum such that a selection of any point within the image preview frame represents a first input to the texture level selector and a second input to the color level selector.

22. The non-transitory program storage device of claim 20, further comprising instructions to cause the one or more processors to display the colorized output image within the image preview frame.

23. The non-transitory program storage device of claim 19, wherein the one or more selectable texture objects comprise one or more selectable objects representative of at least one of a pencil texture type, a charcoal texture type, an ink texture type, a water color texture type, a crayon texture type, and a pastel texture type.

24. The non-transitory program storage device of claim 19, wherein the instructions to cause the one or more processors to generate a first texturized image and a second texturized image comprise instructions to:
   retrieve a predefined coarse texture image corresponding to the selected texture type;
   retrieve a predefined fine texture image corresponding to the selected texture type;
   combine the coarse texture image with the selected image to generate the first texturized image; and
   combine the fine texture image with the selected image to generate the second texturized image.

* * * * *